(No Model.)
W. H. H. SNELLBAKER.
CLEVIS FASTENING.
No. 362,327. Patented May 3, 1887.
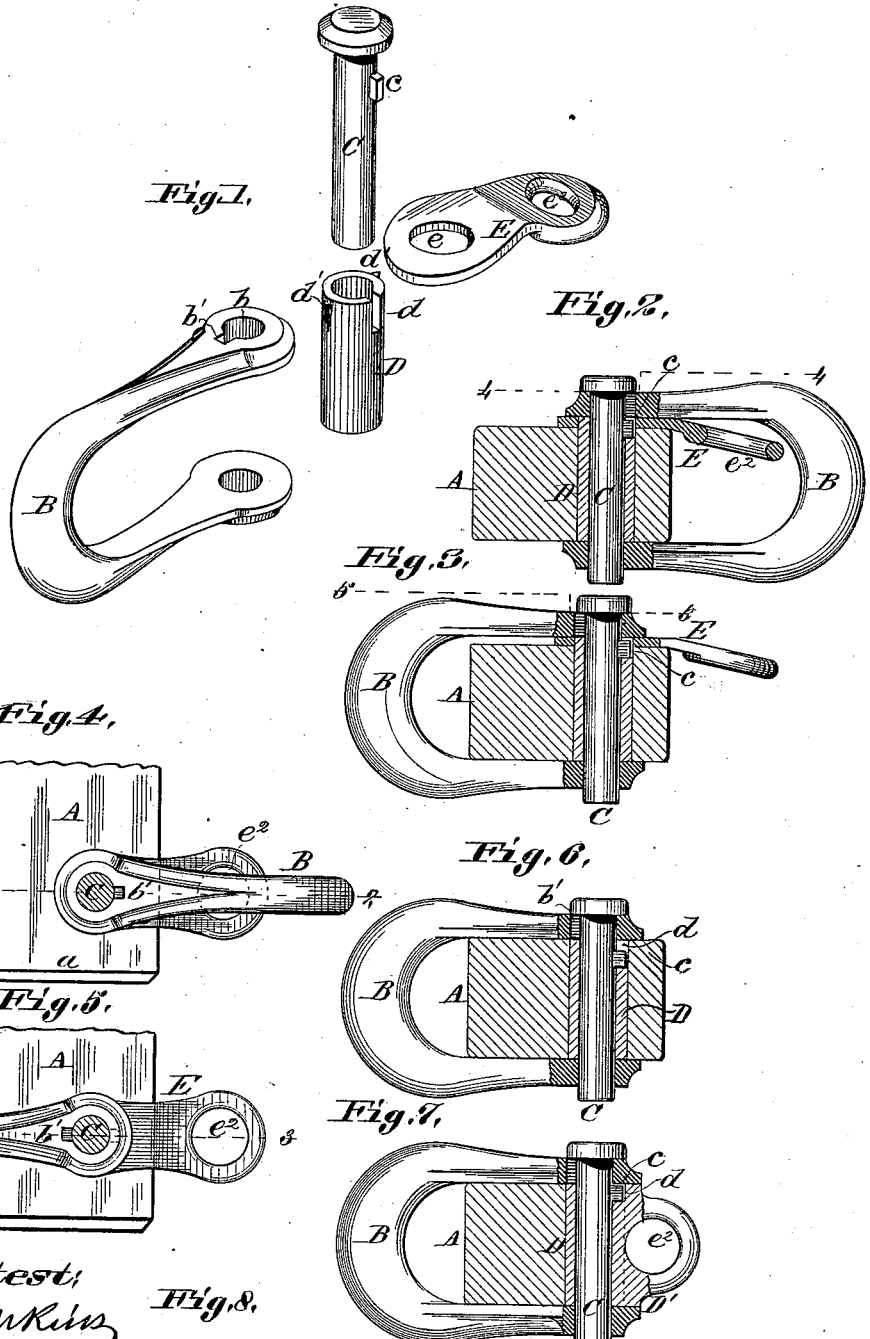
Attest:
F. A. Hopkins
H. S. Knight
Inventor:
W. H. H. Snellbaker.
By Knight Bros.
Atty's

UNITED STATES PATENT OFFICE.

WILLIAM H. H. SNELLBAKER, OF ST. LOUIS, MISSOURI, ASSIGNOR OF ONE-HALF TO FRANZ KREIN, OF SAME PLACE.

CLEVIS-FASTENING.

SPECIFICATION forming part of Letters Patent No. 362,327, dated May 3, 1887.

Application filed October 11, 1886. Serial No. 215,923. (No model.)

*To all whom it may concern:*

Be it known that I, WILLIAM H. H. SNELLBAKER, of the city of St. Louis, in the State of Missouri, have invented a certain new and useful Improvement in Clevis-Fastenings, of which the following is a full, clear, and exact description, reference being had to the accompanying drawings, forming part of this specification, and in which—

Figure 1 is a perspective view showing the parts detached. Fig. 2 is a section at 2 2, Fig. 4. Fig. 3 is a section at 3 3, Fig. 5. Fig. 4 is a section at 4 4, Fig. 2. Fig. 5 is a section at 5 5, Fig. 3. Fig. 6 is an axial section, showing a modification. Fig. 7 is a section at 7 7, Fig. 8. Fig. 8 is a top view of a modification with the clevis and pin removed.

A is a double-tree carrying a clevis, B, near the end, the hole for the clevis-pin C being so near the end of the double-tree that the clevis may be turned half a circle, or through one hundred and eighty degrees between the position for attachment and the working position.

I will first describe the device as shown in Figs. 1 to 5, inclusive.

D is a bushing which is fixed into the double-tree and forms the bearing for the pin C. One side of the upper pin-hole, $b$, of the clevis has a vertical key-seat, $b'$, to allow the passage of a fixed key or stud, $c$, which projects from the side of the clevis pin a little distance from the head $c'$ of the pin. The bushing D has a recess to receive the stud $c$, which recess is in line with the recess or key-seat $b'$ of the clevis when the clevis is in position for attachment or removal, so that the stud may be dropped down through the recess $b'$ into the recess $d$, and when the clevis is swung around to the other side of the double-tree, into working position, the pin cannot be drawn out, being locked in the bushing by the eye of the clevis. The bushing has fins $d'$, to prevent its turning in its socket and to otherwise lock it in place.

E is a link which has one eye, $e$, fitting the upper end of the bushing, which end extends above the double-tree to give bearing to the link, the link being thus interposed between the top of the double-tree and the clevis. The link E has an eye, $e'$, for connection with the stay-chain.

In the modification shown in Fig. 6 the stay-link is dispensed with, the bushing D being flush at the ends with the top and bottom of the double-tree.

In the modification shown in Figs. 7 and 8 the socket made in the double-tree to receive the bushing is open at the rear side, and the bushing is made with a lug, D', extending through said opening and having an eye, $e^2$, for the attachment of a stay-chain.

The manner of putting on the clevis is as follows: (It is understood that the bushing D is a fixture in the double-tree.) The clevis and link E are placed on the double-tree in the position shown in Figs. 2 and 4. The pin C is then put in, the stud $c$ passing through the recess $b'$ into the recess $d$. Then the clevis is turned into the position shown in Figs. 3 and 5, which locks the pin in place.

I claim as my invention—

1. The combination of a clevis, B, with a notch or recess, $b'$, in one eye, pin C, with stud $c$, and bushing D, with recess $d$, substantially as and for the purpose set forth.

2. The combination of a clevis, B, with notched or recessed eye $b$, link E, with eye $e$, bushing D, with recess $d$, and pin C, having stud $c$, for the purpose set forth.

3. The combination of clevis B, with recessed eye $b$, pin C, with stud $c$, bushing D, with recess $d$ and fin $d'$, and a whiffletree, A, substantially as and for the purpose set forth.

WILLIAM H. H. SNELLBAKER.

In presence of—
GEO. H. KNIGHT.
JOS. WAHLE.